Jan. 19, 1926.　　　　　　　　　　　　　　　　1,570,101
E. B. THURSTON
HOISTING AND LOWERING CONTROL MECHANISM
Filed Sept. 30, 1922　　2 Sheets-Sheet 1
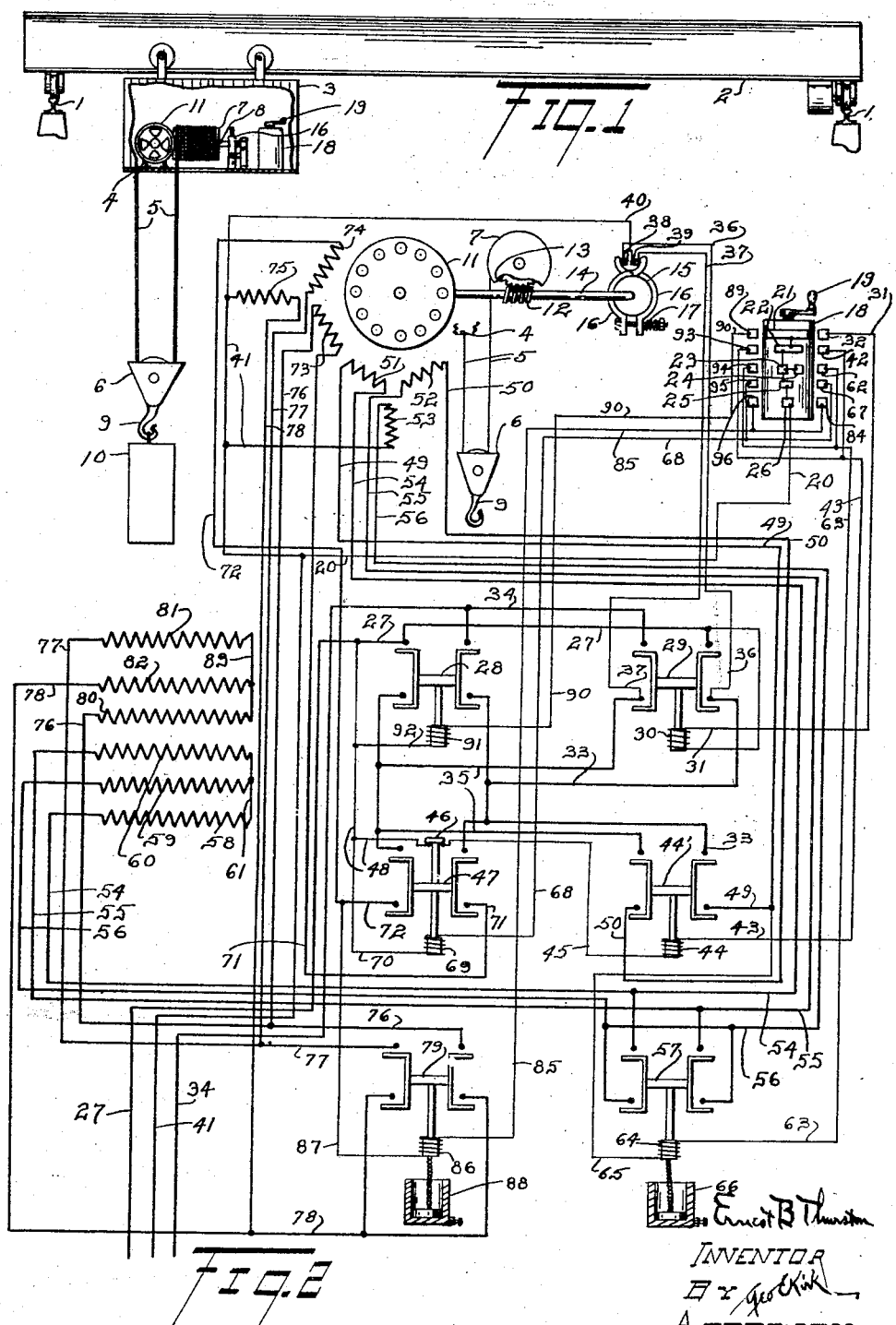

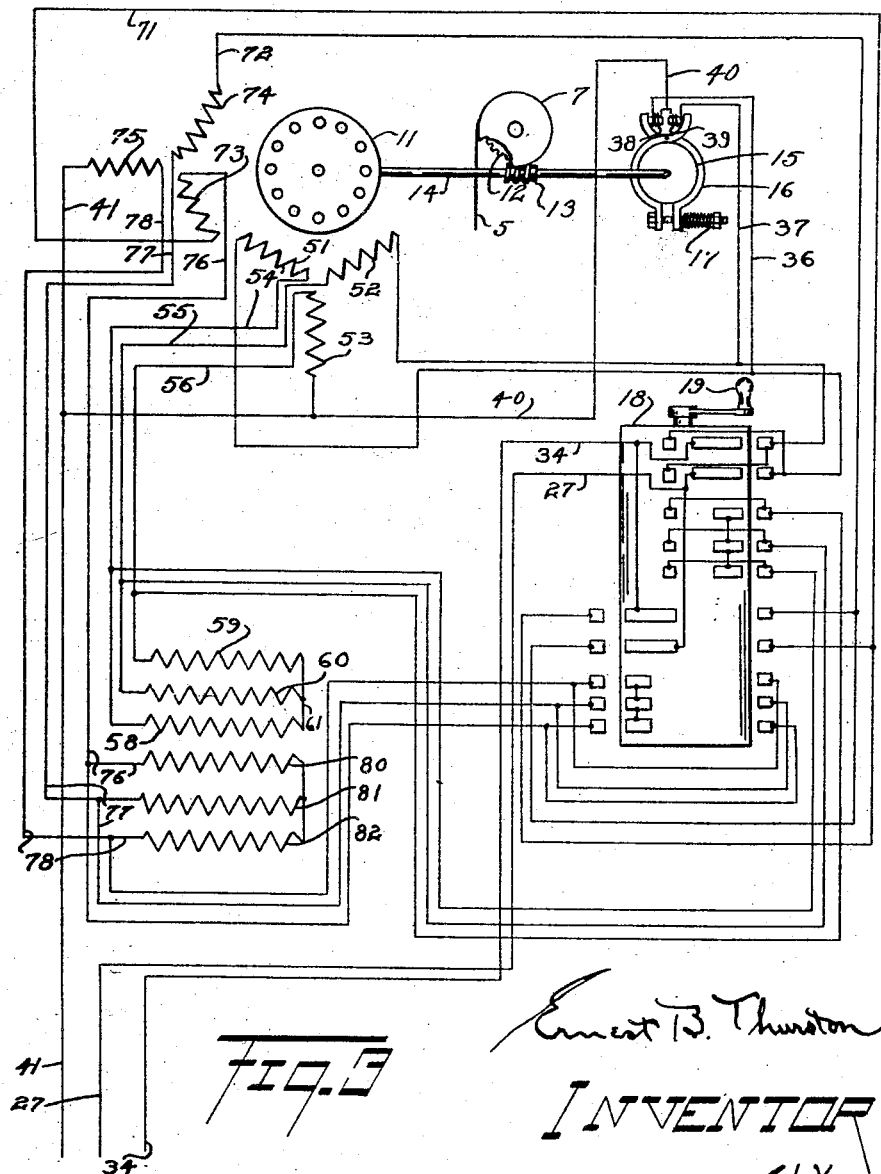

Patented Jan. 19, 1926.

1,570,101

UNITED STATES PATENT OFFICE.

ERNEST B. THURSTON, OF TOLEDO, OHIO, ASSIGNOR TO THE HAUGHTON ELEVATOR & MACHINE CO., OF TOLEDO, OHIO, A CORPORATION OF OHIO.

HOISTING AND LOWERING CONTROL MECHANISM.

Application filed September 30, 1922. Serial No. 591,642.

*To all whom it may concern:*

Be it known that I, ERNEST B. THURSTON, a citizen of the United States of America, residing at Toledo, Lucas County, Ohio, have invented new and useful Hoisting and Lowering Control Mechanisms, of which the following is a specification.

This invention relates to electric control apparatus.

This invention has utility when incorporated in alternating current installations for handling loads which have at all times a tendency to drive the motor, as in hoisting and lowering.

Referring to the drawings:

Fig. 1 is a view of a traveling crane with which an embodiment of the invention is incorporated;

Fig. 2 is a wiring diagram of the control connections for the installation of Fig. 1, with remote control for the switches, as usually preferable in larger power operations; and Fig. 3 is a wiring diagram for simplified direct power control by the switches at the controller.

Elevated tracks 1 are shown as providing a way for car or traveling frame 2, as a way for auxiliary car 3 movable back and forth between the supports or tracks 1. This crane car 3 is shown as having anchor 4 from which extends cable 5 downward about load sustaining block 6, thence upward to the car 3 and there about drum 7 to be anchored at clip 8 with said drum 7. The block 6 may carry a hook 9 for engagement with a load 10. A motor 11 through worm 12 and worm wheel 13 serves to drive the drum 7 in one direction for load hoisting, or against the load tendency upon the connections 5; while in the other direction for load lowering, or with the load tendency.

The normal tendency of the load at all times to drive the motor 11 to effect load lowering is overcome herein by providing on motor shaft 14, which carries the worm 12, a drum 15 engaged by brake shoes 16, normally held in clamping position thereagainst by compression helical spring 17.

The motor herein is preferably a multispeed alternating current electric motor. The selection for the motor 11 may be considered in this instance a three phase 60 cycle 440 volt machine of six to one speed variations, say a slow synchronous speed of 150 R. P. M. and a high synchronous speed of 900 R. P. M. Star windings are shown, and the acceleration resistances placed in such junction of the windings permitting niceties in control, in balancing, and minimizing heating.

Controller 18 for the motor 11 is shown as having operating handle 19 swingable counterclockwise for driving the motor 11 in load lowering, and swingable clockwise for driving the motor 11 in load hoisting. Electric current supply line 20 extends to contacts 21, 22, 23, 24, 25, 26, on the controller drum 18. The angular extent and positions of these contacts are placed for special coaction with terminals determining sequence and control for the motor 11.

Power supply line 27 extends to hoisting or up switch 28 and lowering or down switch 29. From this power line 27 there is a line to lowering switch power actuating means or coil 30 having line 31 therefrom to terminal 32 at the controller. At the first position in counterclockwise shifting of the handle 19 of the controller, current from the line 20 through the contact 21 has circuit closed with the terminal 32, thereby energizing the coil 30 and effecting throwing of this direction switch 29 to closed position. This closing of the direction switch 29, connects the power supply line 27 with the power line 33, and power supply line 34, with line 35.

Branch lines 36, 37, respectively from the lines 33, 35, to brake releasing coils 38, 39, connected by line 40 to power supply line 41, thus at once act to draw the brake shoes 16 away from the drum 15 against the action of the spring 17.

This first position for control operation of the controller handle 19, is not a position for handle rest, but the handle should continue its travel to its second position, where the contact 22 engages terminal 42 connected by way of line 43 through solenoid coil 44 of low speed main switch 44', thence by line 45 past interlock 46 at high speed main switch 47, and thence by line 48 to the power supply line 27. Circuit is thus completed for energizing the low speed main switch coil 44, for throwing the switch 44′. The closing of the switch 44′ is effective to connect power lines 33, 35, respectively with lines 49, 50, extending to low speed windings 51, 52, of the motor 11, which has its third low speed winding 53 connected to the power supply line 41. From these windings 51, 52, 53, extend lines 54, 55, 56, past slow speed acceleration switch 57 to resistances 58, 59, 60, connected by the brought out Y-junction 61, of the star windings. However, at this second position in the lowering shifting of the controller handle 19, the contact 24 connects with terminal 62 simultaneously with the connecting of the terminal 42 with the contact 22. This terminal 62 through line 63 energizes solenoid coil 64 at the slow speed acceleration switch 57, as line 65 from this coil 64 is supplied with current from the line 33 at once the low speed main switch 44′ is closed. A dash pot 66 may retard the closing of this slow speed acceleration switch 57, for such sequence as desired after the closing of the low speed main switch 44′. The closing of this slow speed acceleration switch 57 cuts out the resistances 58, 59, 60.

Accordingly at the second position of the controller handle 19 there is motor handling of the load in lowering such load, with only the low speed windings 51, 52, 53, in, while the load is tending to accelerate the motor. By shifting the controller handle counterclockwise to a third position, the contact 24 rides clear of the terminal 62, and the slow speed acceleration switch 57 has its coil 64 de-energized. This switch, therefore, opens to cut in resistances 58, 59, 60. In alternating electric current operations, when the load drives the motor, an increase in the resistance in the motor circuit tends to speed up the motor. This means that with the motor 11 operating on lowering at the second position of the controller handle 19 with the slow speed windings 51, 52, 53, in, and the resistances 58, 59, 60, out, the motor would slightly exceed 150 R. P. M., while at the third position with these resistances 58, 59, 60, cut in, the motor 11 will further increase its speed, giving flexibility in control for intermediate speeds so desirable in crane operations, as in lifting crucibles in foundries and glass plants, as well as in placing articles in machine assemblies.

Shifting of the controller handle 19 counterclockwise to a fourth position in load lowering, brings the contact 25 to terminal 67 connected by line 68 to coil 69 at the high speed main switch 47. From this high speed main switch solenoid coil 69 extends line 70 to lines 48, 27, completing the circuit for energizing the coil 69 and closing the switch 47. This closing of the main high speed switch 47, through the interlock 46, breaks the circuit of the coil 44 for the slow speed main switch 44′, opening such slow speed main switch, as the switch 47 connects the power lines 33, 35, with lines 71, 72, extending to high speed windings 73, 74 of the motor 11. The power supply line 41 extends directly to third winding 75 of these high speed windings. From these windings 73, 74, 75, extend lines 76, 77, 78, past high speed acceleration switch 79 to resistances 80, 81, 82, having Y-junction 83 as the brought out star connection for the high speed windings of the motor 11. At this fourth position of the controller handle 19, simultaneously with the bringing of the contact 25 to the terminal 67, the contact 26 is brought to terminal 84 connected by line 85 to high speed acceleration switch solenoid coil 86, from which extends line 87 connected to the power line 35 as the high speed main switch 47 is closed. As desired, there may be lag in the throwing in of this switch 79, as determined by adjustable dashpot 88, similar to the dashpot 66. Accordingly, at this fourth position of the controller handle 19, there is not only closing of the high speed main switch 47, but also closing of the switch 79, cutting out the resistances 80, 81, 82, under which condition the motor 11 will exceed its high speed of 900 R. P. M. in load lowering and act as braking generator.

Should it be desired to build up the motor speed beyond its rated capacity, say for an emergency, still further shifting of the controller handle 19 counterclockwise will shift the contact 26 clear of the terminal 84, cutting in the resistances 80, 81, 82, for loading the load driven motor in effecting further increase in speed. In practice, the slow speed resistances 58, 59, 60, providing intermediate speed conditions above low speed with a two speed motor and in conjunction with the low speed windings, is the usual range of motor control and operation, and such intermediate speeds may be obtained in shifting the controller handle 19 from full high speed toward third position.

In load hoisting, clockwise throwing of the controlling handle 19 may effect operation of the motor 11 against the load tendency. The contact 21 at the first position comes to terminal 89, connected through line 90 with up direction switch solenoid coil 91 at the switch 28. From this coil 91 extends line 92 to the lines 48, 27, completing the circuit from the line 20 to energize the coil 91 and close the switch 28 in reversing the power connections to the lines 33, 35, to effect opposite direction of rotation of the motor 11. Continued shifting of the controller 19, through the contact 22 and terminal 93 energizes the coil 44, to close the low speed main switch 44′, cutting in the slow speed windings 51, 52, 53, with their resistances 58, 59, 60. It takes further shifting of the controller 19 to bring the contact 23 to terminal 94 to cut out the low speed acceleration resistances 58, 59, 60. The alternating current electric motor, working against the load with the resistances in series has a stage of operation in coming toward speed. When the resistances 58, 59, 60, are cut out the motor may then approximate its low speed. Intermediate speed on hoisting between low speed and high speed is attained, by the continued travel of the controller handle 19 clockwise to have the contact 25 engage terminal 95, closing the main high speed switch 47, opening the slow speed main switch 44′, and leaving the high speed acceleration resistances 80, 81, 82, in. As the motor is accelerated toward high speed at intermediate speeds, the final shifting of the handle 19 may bring the contact 26 to terminal 96 to cut out the resistances 80, 81, 82, and the motor 11 thus be brought to full speed of 900 R. P. M. in load hoisting. Reversal of shifting of the controller handle 19 toward the starting position, brings about a similar speed sequence toward stopping of the load being lifted.

Ordinarily, it is not desirable in load lowering to have the high speed accelerating resistance in. The low speed acceleration resistance is of importance in slowing down, to an even greater extent than in starting, especially in crane operations. To consume a minimum of time, it is desirable to have the load move rapidly, but high speed may be too great a rate, as the place for depositing the load is approached. Yet again, clear down to low speed may hinder the maximum progress of operations. The intermediate speed above low permitted by the resistance in series allows the operator to get off of high speed, but still at a rate in excess of low, to have the work brought closely to the place for deposit, when as the final positioning is to be had, low speed may be used. There is accordingly, working range of speeds beyond mere two speed motor, and this in a simple control installation with a two-speed motor.

The reference characters as pertinent to Fig. 3, from Fig. 2, are applied thereto. Instead of being in the control circuit, the drum 18 is in the power circuits. The terminals and contacts cut in the power from the lines 34, 27, with the power line 41 extending directly to the windings. These power lines are each connected to release the brake shoes 16. The contacts on the drum 18 serve directly to cut out the acceleration resistances 58, 59, 60, for the low speed windings 51, 52, 53, while the high speed acceleration resistances 80, 81, 82, as controlled by high speed contacts are cut out of the high speed windings 73, 74, 75, at the motor 11.

The features herein described relate to a controller for handling a single motor at different speeds herein shown as in the winding instead of the power supply.

What is claimed and it is desired to secure by Letters Patent is:

1. A multi-speed motor actuating connections therefrom for an uncounterweighted load, means normally holding the motor, power connections for releasing the motor from said means, direction and main switches for the motor and having said power connections therefrom, and a manually operable controller for effecting in manually controlled sequence a plurality of different speeds for the motor.

2. A multi-speed motor, uncounterweighted load actuating connections from the motor, means normally holding the motor, power connections for releasing the motor from said means, different speed switches and resistance for the motor, and means comprising a controller shiftable in motor starting in one direction for connecting said resistance in and then out with one of said switches closed, said controller being provided with connections coacting in motor starting in the other direction for first closing said latter switch and thereafter cutting in said resistance.

3. An alternating current electric motor, uncounterweighted load actuating connections from the motor, means normally holding the motor, power connections for releasing the motor from said means, direction switches and resistance for the motor, and means comprising a controller shiftable in motor starting in one direction for connecting said resistance in and then out and said controller being provided with connections coacting in the other direction of motor starting for first having said resistance out and then cutting it in.

4. An alternating current electric motor, uncounterweighted load actuating connections from the motor, means normally holding the motor, power connections for releasing the motor from said means, first and second speed switches, a resistance for one of the speeds of the motor, and a controller for load lowering operation of the motor cutting in said resistance after the operation of one of said switches.

5. A polyphase alternating current electric motor, load suspending actuating connections from the motor, means normally holding the motor for suspending a load, power connections for releasing the motor from said means, speed switches, a resistance for one of the speeds of the motor, and a controller for load hoisting operation of the motor cutting in said resistance before the motor is up to said speed and then cutting it out as the motor comes up to said speed, and connections for reverse sequence as to said resistance in load lowering starting.

6. A reversible electric motor, load suspending actuating connections from the motor including a plurality of power supply lines for the motor, a switch for connecting said lines to the motor, a controller for the switch movable in one direction for one direction of motor operation and in the reverse direction for the reverse direction of motor operation, and an acceleration resistance connected to be cut in after the operation of said switch in the other direction for increasing load lowering speed of the motor.

7. A reversible electric motor, load suspending actuating connections from the motor, a switch for the motor, an acceleration resistance for the motor, and a reversible controller effective in load hoisting starting of the motor to cut said resistance out as the motor is brought up to speed in one direction of controller operation and reversely effective in load lowering to cut said resistance in as the motor in starting is brought to similar speed.

8. An electric motor, load suspending actuating connections from the motor including a plurality of power supply lines for the motor, first and second speed switches for connecting said lines to the motor, a second speed acceleration resistance, and a controller for the switches and resistance for cutting in the resistance after the operation of said second speed switch for increasing load lowering speed of the motor.

9. A reversible electric motor, load connections tending to drive the motor in one direction, first and second speed switches for the motor, a second speed acceleration resistance, and a controller for the switches and resistance, cutting out said resistance in bringing the motor up to said second speed against the load driving tendency of the connections, and reversely acting to cut in said resistance in coming up to speed with the load driving tendency of the connections.

10. A reversible multi-speed electric motor, load connections tending to drive the motor in one direction, speed switches, acceleration resistances, and a reversible controller shiftable to bring the motor up to speed by cutting said resistances in after the operation of the respective switches.

11. A reversible multi-speed alternating current electric motor, load connections tending to drive the motor in one direction, speed switches, acceleration resistance for each speed, and a controller shiftable, when the motor operates against the connections, to cut the respective resistances out in bringing the motor to the speeds determined by the respective switches and reversely cutting in said resistances in motor starting with the tendency of the load connections to bring the motor to the speeds determined by the respective switches.

12. A reversible alternating current electric motor, load connections tending to drive the motor in one direction, electrical connections and switches for controlling supplies of current for different synchronous speeds of the motor, acceleration resistance for each speed, and a controller shiftable, when the motor operates against the load connections, to cut out the respective resistances in bringing the motor to the speeds determined by the respective switches and reversely cutting in said resistances in motor starting with the tendency of the load connections to bring the motor to the speeds determined by the respective switches.

In witness whereof I affix my signature.

ERNEST B. THURSTON.